(12) United States Patent
Blandino et al.

(10) Patent No.: US 6,360,841 B1
(45) Date of Patent: Mar. 26, 2002

(54) POWER STEERING MECHANISM WITH MAGNETOELASTIC TORSION BAR

(75) Inventors: Don Blandino, Sterling Heights; Leonid V. Bogdanov; Philip H. Berger, both of Troy, all of MI (US); Lutz Axel May, Newbury; Richard Wotherspoon, Banbury, both of (GB)

(73) Assignees: TRW Inc., Lyndhurst, OH (US); FAST Technology GmbH, Unterfohring (DE)

( * ) Notice: Subject to any disclaimer, the term of this patent is extended or adjusted under 35 U.S.C. 154(b) by 0 days.

(21) Appl. No.: 09/516,382

(22) Filed: Feb. 29, 2000

(Under 37 CFR 1.47)

(51) Int. Cl.[7] .................................................. B62D 5/99
(52) U.S. Cl. ........................................ 180/443; 180/444
(58) Field of Search ........................ 180/417, 421–423, 180/443, 444, 446; 91/375 A

(56) References Cited

U.S. PATENT DOCUMENTS

| 4,572,005 A | 2/1986 | Kita ........................ 73/862.36 |
| RE32,222 E | 8/1986 | Drutchas ................... 180/79.1 |
| 4,711,134 A | 12/1987 | Kita ........................ 73/862.36 |
| 4,811,609 A | 3/1989 | Nishibe et al. .......... 73/862.36 |
| 4,996,905 A | 3/1991 | Borror ..................... 91/375 A |
| 5,213,174 A | 5/1993 | Adams ....................... 180/147 |
| 5,255,567 A | 10/1993 | Miyake et al. .......... 73/862.333 |
| 5,307,690 A | 5/1994 | Hanazawa ............... 73/862.333 |
| 5,307,691 A | 5/1994 | Miyake et al. .......... 73/862.333 |
| 5,511,630 A | * 4/1996 | Kohata et al. .............. 180/142 |
| 5,520,059 A | 5/1996 | Garshelis ............... 73/862.335 |
| 5,579,861 A | * 12/1996 | Ballester ..................... 180/422 |
| 5,708,216 A | * 1/1998 | Garshelis ............... 73/862.335 |
| 5,725,023 A | 3/1998 | Padula ................... 137/596.17 |
| 5,836,419 A | * 11/1998 | Shimizu et al. ............. 180/443 |
| 6,047,605 A | * 4/2000 | Garshelis ............... 73/862.336 |
| 6,145,387 A | * 11/2000 | Garshelis ............... 73/862.336 |

FOREIGN PATENT DOCUMENTS

| WO | WO 9921150 | 4/1999 |
| WO | WO 9921151 | 4/1999 |

* cited by examiner

Primary Examiner—J. J. Swann
Assistant Examiner—L. Lum
(74) Attorney, Agent, or Firm—Tarolli, Sundheim, Covell, Tummino & Szabo L.L.P.

(57) ABSTRACT

A power steering mechanism (10) for turning steerable wheels of a vehicle comprises a rotatable input member (22), a rotatable output member (26), and a torsion bar (28) connecting the input member and the output member. The torsion bar (28) is fixedly connected to the output member (26) and twists upon relative rotation between the input member (22) and the output member. The torsion bar (28) is made of a magnetoelastic material and has a defined surface area (90) which carries a magnetic field, which magnetic field varies upon twisting of the torsion bar, magnetic field detector (94) is located to sense variance in the magnetic field. The input member (22) is interposed between the torsion bar (28) and the magnetic field detector (94) and is made of a non-magnetic material.

8 Claims, 3 Drawing Sheets

POWER STEERING MECHANISM WITH MAGNETOELASTIC TORSION BAR

TECHNICAL FIELD

The present invention relates to a power steering mechanism for turning steerable wheels of a vehicle, and is particularly directed to a steering mechanism having a magnetoelastic torsion bar.

BACKGROUND OF THE INVENTION

One known type of a power steering mechanism for turning steerable wheels of a vehicle includes a ball nut for transmitting force between an axially movable rack member and an electric motor. Upon actuation of the electric motor, the ball nut is driven to rotate relative to the rack member. The rotational force of the ball nut is transmitted to the rack member by balls to drive the rack member axially. Axial movement of the rack member effects turning movement of the steerable wheels.

In such a steering mechanism, the electric motor provides power steering assistance to a vehicle driver to accomplish the turning of the steerable wheels. This power assistance may be controlled in response to the torque applied to the vehicle's steering wheel by the driver and other parameters such as vehicle speed. The steering mechanism includes an input shaft connected with the steering wheel and an output shaft operatively coupled with the rack member for mechanically moving the rack member axially. The input shaft and the output shaft are connected by a torsion bar which twists in response to steering torque applied to the steering wheel. When the torsion bar twists, relative rotation occurs between the input shaft and the output shaft.

Various angular displacement sensors are known for use in detecting applied steering torque between an input shaft and an output shaft. One known method for detecting applied steering torque utilizes a magnetoelastic ring attached to the torsion bar. Magnetic field sensors detect the application of torque to the torsion bar through the magnetoelastic ring. The ring, however, can be caused to rotate relative to the torsion bar under high torque conditions. Rotation of the ring relative to the torsion bar leaves residual stress in the steering mechanism and causes problems with signal degradation, accuracy, and zero shift. Thus, the elimination of such a ring is desirable.

Another known type of power steering mechanism uses an electric motor to rotate a pinion gear, which in turn drives the rack member axially, based on the applied steering torque and other parameters.

Other known steering mechanisms use a hydraulic motor and associated cylinder, instead of an electric motor, to provide power steering assist based on applied steering torque and other parameters.

SUMMARY OF THE INVENTION

The present invention is a power steering mechanism for turning steerable wheels of a vehicle. The steering mechanism comprises an input member rotatable about a first axis, an output member rotatable about a second axis coaxial with the first axis, and a torsion bar connecting the input member and the output member. The torsion bar is fixedly connected to the output member and twists upon relative rotation between the input member and the output member about the axes. The torsion bar is made of a magnetoelastic material and has a defined axially extending and circumferentially extending surface area which carries a magnetic field, which magnetic field varies upon twisting of the torsion bar. A magnetic field detector is located to sense variance in the magnetic field. The input member is interposed between the torsion bar and the magnetic field detector and is made of a non-magnetic material.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF A PREFERRED EMBODIMENT

Figure 1:
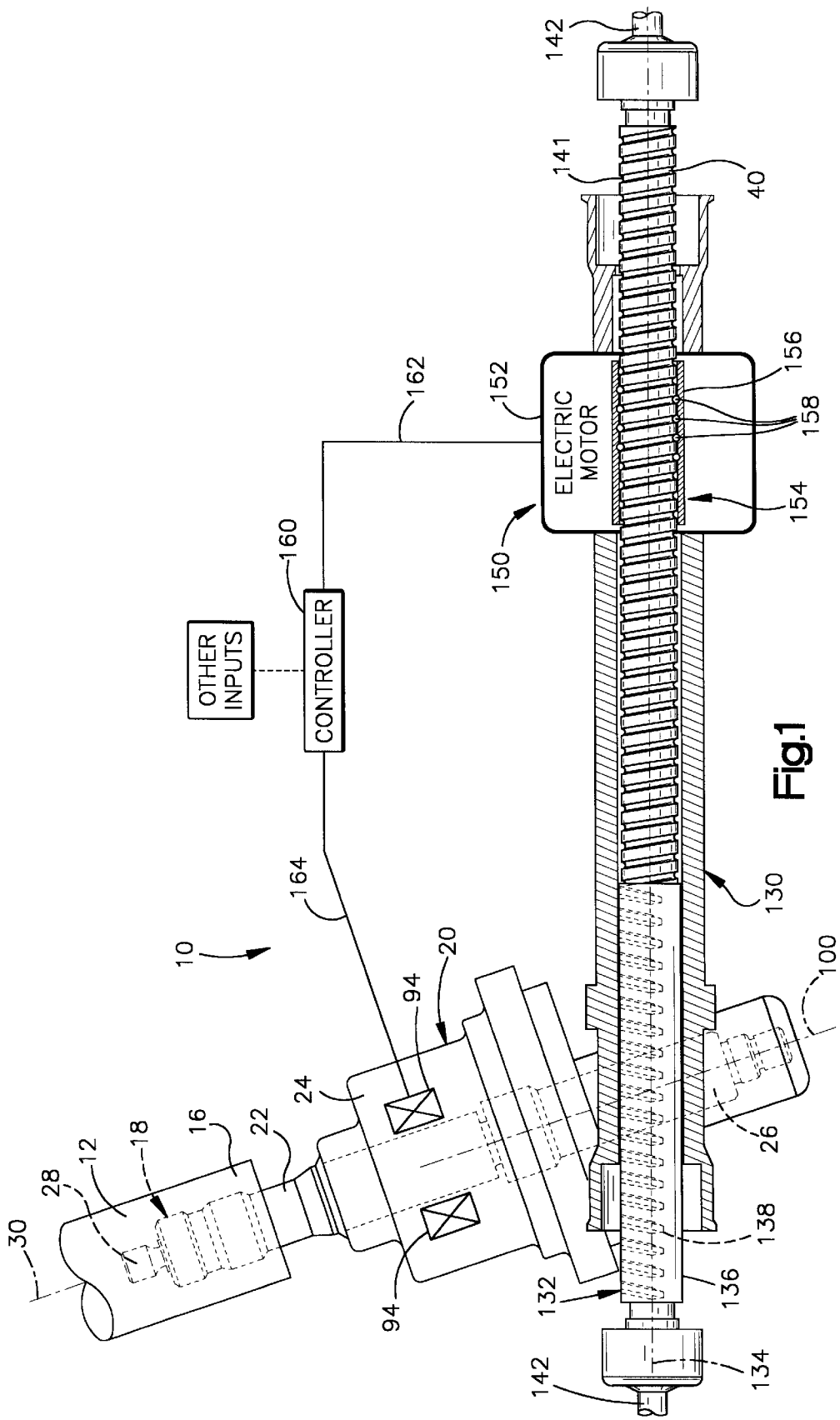
FIG. 1 is a schematic view of a steering mechanism for turning steerable wheels in accordance with the present invention.

The present invention relates to a steering mechanism for turning steerable wheels of a vehicle. As representative of the present invention, FIG. 1 illustrates a power steering mechanism 10 for a vehicle, such as an automobile.

The steering mechanism 10 includes a rotatable intermediate steering shaft 12 which is operatively coupled for rotation with a vehicle steering wheel (not shown). The intermediate steering shaft 12 has a female end 16 which receives one end 18 of an input pinion assembly 20. The input pinion assembly 20 comprises an input shaft 22, a shaft housing 24, an output pinion 26, and a torsion bar 28.

The input shaft 22 is rotatable about a first axis 30 and is supported for rotation by the shaft housing 28 in a manner not shown. The input shaft 22 is made from a non-magnetic, non-ferrous material. Preferably, the material of the input shaft 22 is selected from a group of materials consisting of non-ferrous stainless steel, brass, titanium, and aluminum.

Figure 3:
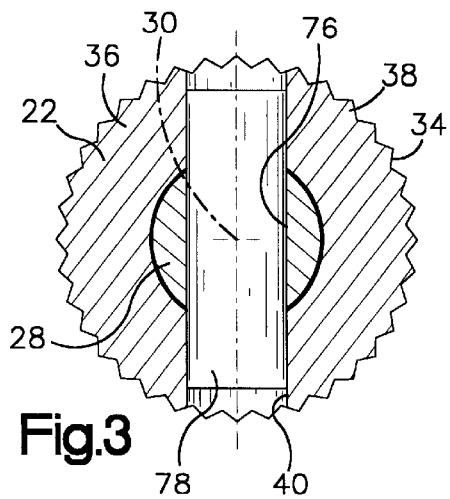
FIG. 3 is a sectional view taken along line 3—3 in FIG. 2.

The input shaft 22 is tubular in shape defined by generally cylindrical inner and outer surfaces 32 and 34. A first end portion 36 of the input shaft 22 is disposed in the female end 16 of the intermediate steering shaft 12. The outer surface 34 in the first end portion 36 of the input shaft includes splines 38 (FIG. 3) which mate with corresponding splines (not numbered) inside the female end of the intermediate steering shaft to drivingly connect the input shaft with the intermediate steering shaft. The first end portion 36 of the input shaft 22 further includes a radially extending passage 40.

Figure 2:
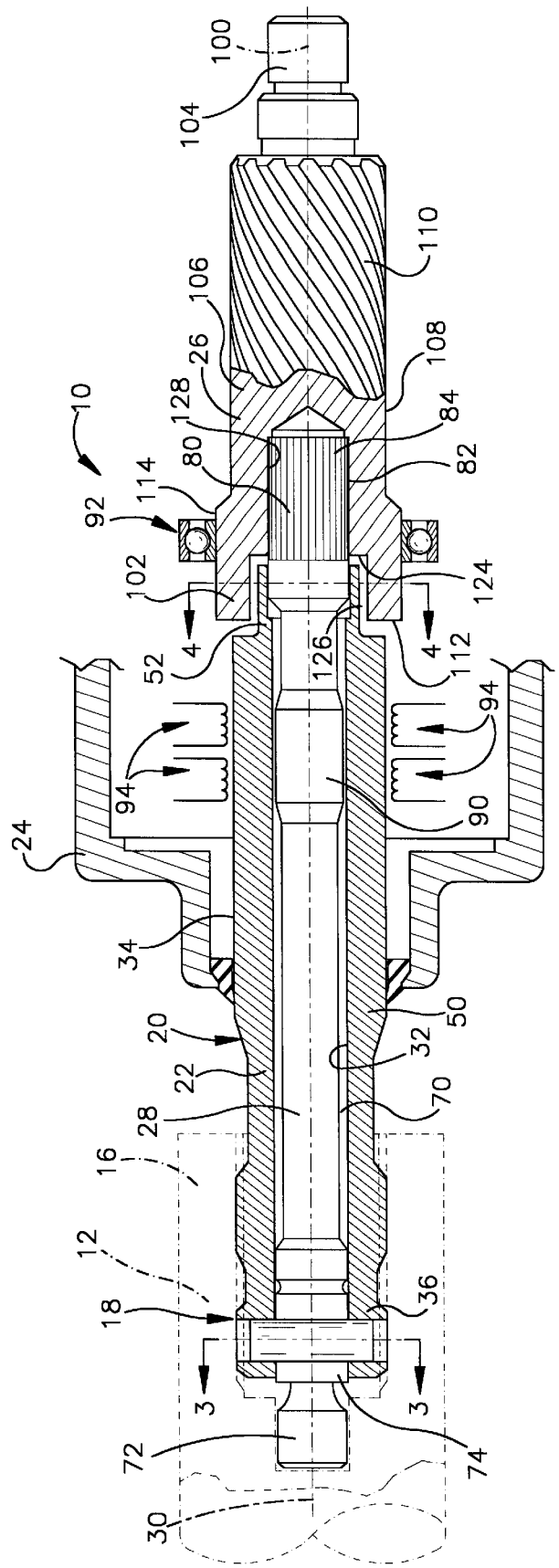
FIG. 2 is a partial sectional view of components of the steering mechanism of FIG. 1.
Figure 4:
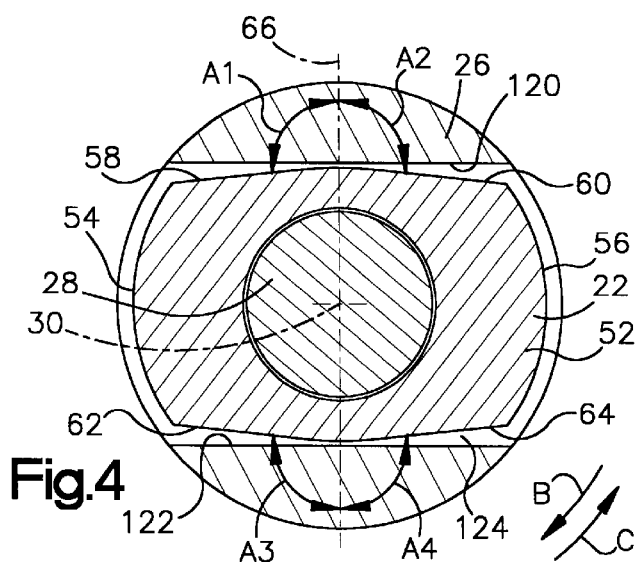
FIG. 4 is a sectional view taken along line 4—4 in FIG. 2 illustrating parts of the steering mechanism in a neutral steering condition.

The input shaft 22 includes a middle portion 50 (FIG. 2) and a second end portion 52, both of which are disposed within the shaft housing 24. The outer surface 34 in the second end portion 52 of the input shaft 22 is not cylindrical, but instead has diametrically opposed first and second cylindrical surface segments 54 and 56 (FIG. 4) connected by a plurality of planar surfaces. The plurality of planar surfaces includes first and second planar surfaces 58 and 60 which together extend between the two cylindrical surface segments 54 and 56, and third and fourth planar surfaces 62 and 64 which also together extend between the two cylindrical surface segments.

The first and second planar surfaces 58 and 60 intersect along a vertical plane 66 extending through the axis 30 of the input shaft 22. The first planar surface 58 extends from its intersection point with the second planar surface 60 at an angle A1, which is preferably 94° and 98°, from the vertical plane 66. Similarly, the second planar surface 60 extends from its intersection point with the first planar surface 58 at an angle A2, which is preferably between 94° and 98°, from the vertical plane 66.

The third and fourth planar surfaces 62 and 64 also intersect along the vertical plane 66 extending through the axis 30 of the input shaft 22, at a point diametrically opposite the point where the first and second planar surfaces 58 and 60 intersect. The third planar surface 62 extends from its intersection point with the fourth planar surface 64 at an angle A3, which is preferably between 94° and 98°, from the vertical plane 66. Similarly, the fourth planar surface 64 extends from its intersection point with the third planar surface 62 at an angle A4, which is preferably between 94° and 98°, from the vertical plane 66.

The cylindrical inner surface 32 of the input shaft 22 defines a continuous bore 70 (FIG. 2) extending from the first end portion 36 to the second end portion 52 of the input shaft. The torsion bar 28 is disposed in the bore 70 through the input shaft 22. The torsion bar 28 twists in response to steering torque applied to the steering wheel. When the torsion bar 28 twists, relative rotation occurs between the input shaft 22 and the output pinion 26, as described further below.

The torsion bar 28 is generally cylindrical in shape and is made of a magnetoelastic material. Preferably, the torsion bar 28 is made of a carbon steel alloy which has 2–5% Ni. A first end portion 72 of the torsion bar 28 projects beyond the first end portion 36 of the input shaft 22 and is received in the female end 16 of the intermediate steering shaft 12.

The torsion bar 28 has a connecting portion 74 which is located adjacent the first end portion 72 and which is disposed within the first end portion 36 of the input shaft 22. The connecting portion 74 includes a radially extending opening 76 which aligns with the passage 40 in the first end portion 36 of the input shaft 22. A cylindrical pin 78 is pressed into the radially extending opening 76 in the torsion bar 28 and the radially extending passage 40 in the input shaft 22 to drivingly connect the first end portion 36 of the input shaft with the torsion bar.

A second end portion 80 of the torsion bar 28 projects beyond the second end portion 52 of the input shaft 22. The second end portion 80 of the torsion bar 28 includes an outer surface 82 with a circumferential array of axially extending splines 84.

The torsion bar 28 further includes a defined axially and circumferentially extending surface area 90 intermediate the first and second end portions 72 and 80 of the torsion bar. The defined surface area 90 is disposed within the bore 70 through the input shaft 72 and is contained inside the shaft housing 24. The defined surface area 90 is adapted to carry a magnetic field.

As best seen in FIG. 1, the shaft housing 24 encircles a portion of the input shaft 22 and the entire output pinion 26. The shaft housing 24 includes a plurality of bearings 92, only one of which is shown schematically in FIG. 2, for supporting rotation of the input shaft 22 and the output pinion 26. A plurality of magnetic field detectors 94 are mounted inside the shaft housing 24. The magnetic field detectors 94 encircle the input shaft 22 and are located radially outward of the defined surface area 90 on the torsion bar 28.

The output pinion 26 is rotatable about a second axis 100 which is coaxial with the first axis 30. The output pinion 26 is preferably made of metal and has oppositely disposed first and second end portions 102 and 104 which are separated by a center section 106. The second end portion 104 is supported by a bearing (not shown) for rotation within the shaft housing 24. The center section 106 has a generally cylindrical outer surface 108 which includes an axially and circumferentially extending plurality of helical teeth 110.

The first end portion 102 of the output pinion 26 has a radially extending end surface 112 and a cylindrical outer surface 114. The cylindrical outer surface 114 is engaged by the bearing 92 which is supported by the shaft housing 24 in a manner not shown. The first end portion 102 of the output pinion 26 further includes parallel, axially extending first and second flat surfaces 120 and 122 which intersect a radially extending inboard surface 124. The flat surfaces 120 and 122 and the inboard surface 124 together define a recess 126 (FIG. 2) in the first end portion 102 of the output pinion 26. A cylindrical inner surface 128 extends from the inboard surface 124 into the center section 106 of the output pinion 26 and defines a cavity (not numbered) in the output pinion 26.

The input shaft 22 and the torsion bar 28 are received in the first end portion 102 of the output pinion 26. More specifically, the splined second end portion 80 of the torsion bar 28 is press fit into the cavity in the output pinion 26 and the second end portion 52 of the input shaft 22 is disposed in the recess 126 in the output pinion 26. The receipt of the second end portion 52 of the input shaft 22 in the recess 126 in the output pinion 26 forms a connection between the input shaft and the output pinion which allows for limited relative rotation between the input shaft and the output and which thereby limits the amount of twisting of the torsion bar.

In a neutral steering condition (shown in FIG. 4), the first and second planar surfaces 58 and 60 on the input shaft 22 are spaced radially from the first flat surface 120 on the output pinion 26. Likewise, in the neutral steering condition, the third and fourth planar surfaces 62 and 64 on the input shaft 22 are spaced radially from the second flat surface 122 on the output pinion 26. Thus, in the neutral steering condition, relative rotation between the input shaft 22 and the output pinion 26 in either a clockwise direction B or a counterclockwise direction C is permitted.

Figure 5:
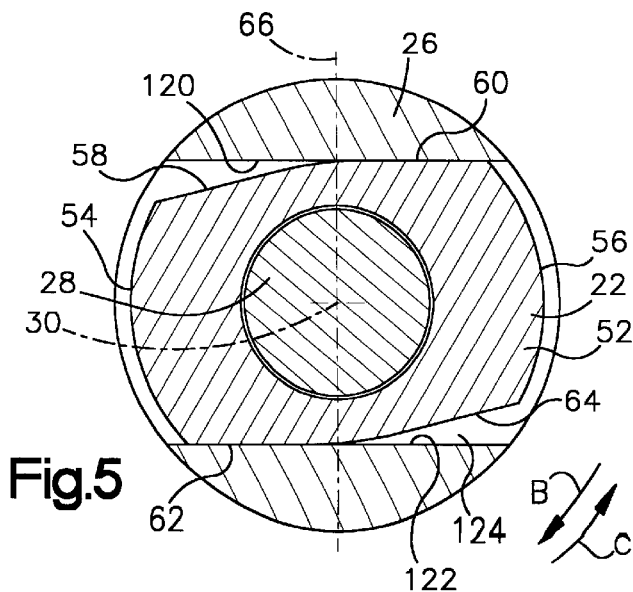
FIG. 5 is a view similar to FIG. 4 illustrating parts of the steering mechanism in a rotated condition.

Relative rotation between the input shaft 22 and the output pinion 26 is permitted until one of the planar surfaces 58–64 comes into surface contact with a respective one of the first and second flat surfaces 120 and 122, such as is shown in FIG. 5. If one or more of the planar surfaces 58–64 is in contact with a respective one of the flat surfaces 120 and 122 as a result of rotation in a given direction, additional rotation of the input shaft 22 in that same direction will result in joint rotation of the input shaft and the output pinion 26, rather than relative rotation between the two parts. Such joint rotation provides manual steering of the vehicle in the event that the power assistance mechanism described below is not functioning properly.

The shaft housing 24 in the steering assembly 10 is attached to a rack housing 130 (FIG. 1). A linearly movable steering member 132 extends axially through the rack housing 130. The steering member 132 is linearly (or axially) movable along a rack axis 134. A rack portion 136 of the steering member 132 has a series of rack teeth 138 which meshingly engage the helical teeth 110 on the output pinion 26. The steering member 132 further includes a screw portion 140 having an external thread convolution 141. The steering member 132 is connected with steerable wheels (not shown) of the vehicle through tie rods 142 located at the distal ends of the steering member 132. Linear movement of the steering member 132 along the rack axis 134 results in steering movement of the steerable wheels as is known in the art.

The steering assembly 10 includes a power steering assistance mechanism 150 comprising an electric motor 152 drivably connected to a ball nut assembly 154 for effecting axial movement of the steering member 132 upon rotation of the steering wheel. The ball nut assembly 154 includes a ball nut 156 and a plurality of balls 158 disposed between the ball nut and the screw thread convolution 141 on the steering member 132. In the event of the inability of the electric motor 152 to effect axial movement of the steering member 132, the mechanical connection between the helical teeth 110 on the output pinion 26 and the rack teeth 138 on the rack portion 136 of the steering member 132 permits manual steering of the vehicle.

The power steering assistance mechanism 150 includes an electronic control unit or controller 160 (FIG. 1). The controller 160 is preferably secured to the rack housing 130 in a manner not shown. The controller 160 is electrically connected to the electric motor 152 by electrical lines 162 and is electrically connected by electrical lines 164 to the magnetic field detectors 94. The controller 160 is also electrically connected to other sensors (not shown) in the vehicle, such as a vehicle speed sensor, which provide electrical input signals to the controller. The controller 160 is operable to receive electrical signals from the magnetic field detectors 94 and the other sensors to control the electric motor 152 in accordance with the received electrical signals.

When the vehicle's electrical system is activated, the defined surface area 90 on the torsion bar 28 is circularly magnetized. In the neutral steering condition when no torsional stress is being applied to the torsion bar 28, only negligible magnetic fields are apparent adjacent to the magnetized surface area 90. When steering torque is applied to the vehicle steering wheel, the input shaft 22 rotates about the first axis 30 and applies torsional stress to the torsion bar 28. This torsional stress generates a low-frequency magnetic field outside the magnetized surface area 90.

The non-ferrous material of the input shaft 22 surrounding the surface area 90 of the torsion bar 28 allows the generated magnetic field to pass through the input shaft to the magnetic field detectors 94. Changes in the magnetic field generated by torsional stress on the torsion bar 28 are proportional to the direction and magnitude of the applied steering torque and are sensed by the magnetic field detectors 94. The magnetic field detectors 94 output an electrical signal to the controller 160 corresponding to the sensed torque direction and magnitude. The electric motor 152 is energized by a control signal transmitted to the electric motor by the controller 160, causing the ball nut 156 to rotate about the rack axis 134.

The rotation of the ball nut 156 results in linear movement of the steering member 132. The balls 158 in the ball nut assembly 154 transmit the rotation force of the ball nut 156 to the rack portion 140 of the steering member 132. Because the ball nut 156 is fixed in position axially, the steering member 132 is driven to move axially in response, effecting steering movement of the steerable wheels of the vehicle. The electric motor 152 thus provides steering assist in response to the applied steering torque as sensed by the magnetic field detectors 94.

It should be noted that strategic placement of the magnetic field detectors 94 in a differential location relative to the surface area 90 can help to reject undesired common mode magnetic fields and reduce the effects of run-out of the torsion bar 28.

The steering mechanism disclosed above is particularly advantageous because it utilizes proven designs for the input shaft 22, the torsion bar 28, and the output pinion 26. The non-contacting magnetic field detectors 94 have a near infinite life and are lower cost items than competing sensor technologies. Further, with the omission of a magnetoelastic ring attached to the torsion bar 28, there is no structure in the present invention which would leave residual stress in the system under high torque conditions. Moreover, over-torque conditions which would create signal degradation problems are avoided by the joint rotation of the input shaft 22 and the output pinion 26 when the surfaces 58–64 engage one of the surfaces 120 and 122. With over-torque conditions eliminated by the structure of the present invention, the steering mechanism can be optimized for high resolution at low applied torque values.

From the above description of the invention, those skilled in the art will perceive improvements, changes and modifications. Such improvements, changes and modifications within the skill of the art are intended to be covered by the appended claims.

Having described the invention, we claim:

1. A steering mechanism for turning steerable wheels of a vehicle, said steering mechanism comprising:

an input member rotatable about a first axis;

an output member rotatable about a second axis coaxial with said first axis;

a torsion bar connecting said input member and said output member, said torsion bar being fixedly connected to said output member and twisting upon relative rotation between said input member and said output member about said axes;

said torsion bar being made of a magnetoelastic material and having a defined axially extending and circumferentially extending surface area which carries a magnetic field, which magnetic field varies upon twisting of said torsion bar; and at least one magnetic field detector located to sense variance in said magnetic field;

said input member having a portion completely circling said torsion bar, said portion being radially aligned with and interposed between said torsion bar and said at least one magnetic field detector and being made of a non-magnetic material.

2. A steering mechanism as defined in claim 1 wherein said input member comprises a tube through which said torsion bar extends and inside which said surface area is located.

3. A steering mechanism as defined in claim 2 wherein said input member is made of a material selected from the group consisting of non-ferrous stainless steel, brass, titanium, and aluminum.

4. A steering mechanism as defined in claim 1 further including a rack and a pinion, said rack having rack teeth and being longitudinally movable to effect turning of the steerable wheels, said pinion being in meshing relation with said rack teeth.

5. A steering mechanism as defined in claim 4 further including a controller and an electric motor, said electric motor, when electrically energized, moving said rack longitudinally, said at least one magnetic field detector sending a signal indicative of the sensed magnetic field to said controller, said controller controlling the electrical energization of said electric motor in response to said signal.

6. A steering mechanism as defined in claim 5 wherein said input member comprises a tube through which said torsion bar extends and inside which said surface area is located.

7. A steering mechanism as defined in claim 5 wherein said input member is made of a material selected from the group consisting of non-ferrous stainless steel, brass, titanium and aluminum.

8. A steering mechanism for turning steerable wheels of a vehicle, said steering mechanism comprising:

an input member rotatable about a first axis;

an output member rotatable about a second axis coaxial with said first axis;

a torsion bar connecting said input member and said output member, said torsion bar being fixedly connected to said output member and twisting upon relative rotation between said input member and said output member about said axes;

said torsion bar being made of a magnetoelastic material and having a defined axially extending and circumferentially extending surface area which carries a magnetic field, which magnetic field varies upon twisting of said torsion bar; and at least one magnetic field detector located to sense variance in said magnetic field;

said input member being interposed between said torsion bar and said at least one magnetic field detector and being made of a non-magnetic material;

wherein said input member has means for limiting the amount of twisting of said torsion bar, said means including a connection with said output member which permits rotation of said input member relative to said output member for a limited amount and which thereafter connects said input member to said output member for joint rotation.

* * * * *